Jan. 9, 1951   M. R. LUDWIG   2,537,902
MOTOR SPEED CONTROL APPARATUS
Filed April 10, 1944   2 Sheets-Sheet 2
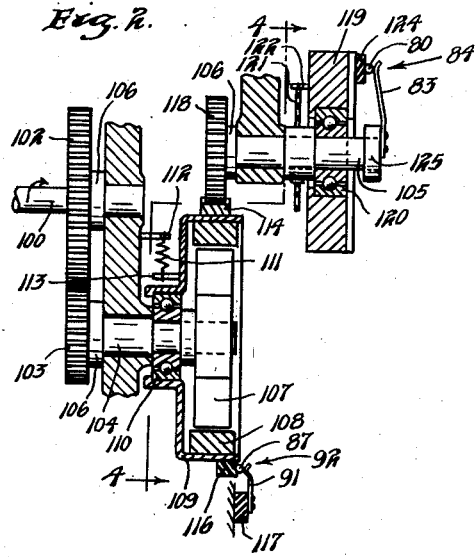
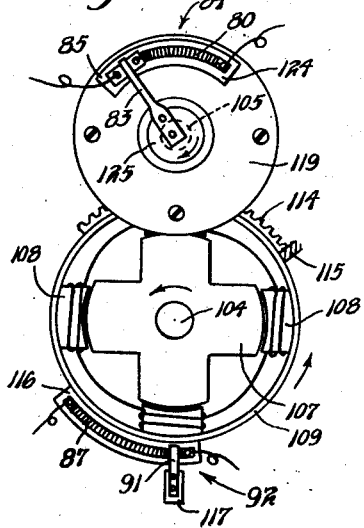
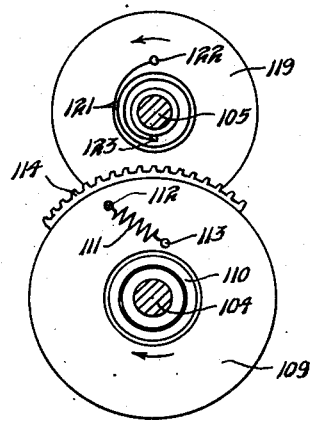
Inventor
MERLE R. LUDWIG
George H. Fisher
Attorney Patented Jan. 9, 1951

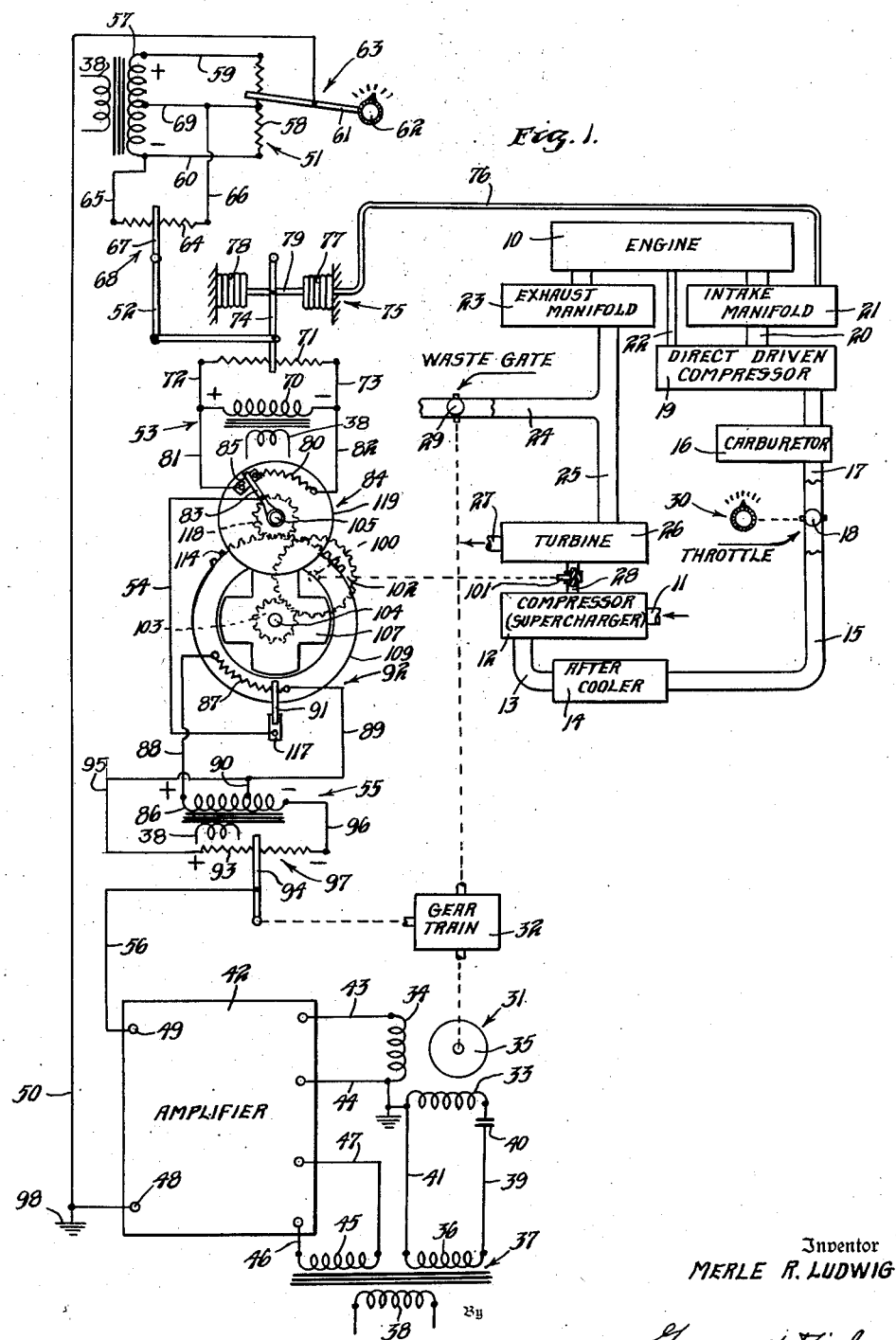

2,537,902

UNITED STATES PATENT OFFICE 2,537,902

MOTOR SPEED CONTROL APPARATUS

Merle R. Ludwig, Minneapolis, Minn., assignor to Minneapolis-Honeywell Regulator Company, Minneapolis, Minn., a corporation of Delaware Application April 10, 1944, Serial No. 530,421

7 Claims. (Cl. 137—158)

This invention relates to improvements in systems, or apparatus, for controlling the operation of a compressor, commonly called a supercharger, used in connection with aircraft and other engines of the internal combustion type.

In one form of supercharger, the compressor, used for supplying air under pressure to the intake manifold of the engine, is driven by a turbine powered by the exhaust gases from the engines. The speed at which such a unit runs, and hence the compression ratio of the compressor, is controlled by means of a valve or damper, termed the waste gate, which by-passes a variable part of the exhaust gases direct to atmosphere instead of through the turbine. Automatic control and maintenance of selected pressure in the manifold, under the widely and rapidly varying atmospheric pressures encountered in flight, are secured by adjusting the position of this waste gate. Such apparatus and control systems have been disclosed in prior applications, for example, the application of Hubert T. Sparrow, Serial No. 476,797, filed February 22nd, 1943, now Patent No. 2,477,668, issued August 2, 1949.

The present invention has more particular reference to control of the speed at which the turbine and compressor operate. At the higher altitudes particularly, and when a high order of intake manifold pressure is desired, the turbine and compressor necessarily operate near the upper limits of permissible speed. This speed must be limited to a safe value to prevent injury to the parts. Also the rate of change of acceleration of the turbine and the magnitude of compressor speed must be controlled since too rapid change in acceleration would cause surges in the pressure, and hunting of the control system which maintains the pressure at the selected value.

It is the primary object of this invention, therefore, to provide a control system, or apparatus, for preventing overspeeding of the turbine and compressor and to limit the rate of change of acceleration thereof to a safe value under all circumstances.

Another object is to provide means for this purpose which is entirely automatic in operation and which will override the pressure control system when it calls for an increase in pressure and resulting increase in speed of the turbine and compressor, when such speed increase would carry it above the safe value, or cause too rapid a rate of change of acceleration.

Another object is to provide a system of this character which employs as the main control means an electromechanical, dynamometer type of unit which sets up a rotating magnetic field, the speed of which is indicative of the speed of operation of the turbine and compressor, and which utilizes changes in speed of such rotation of the field to limit both the speed and rate of change of acceleration of turbine and compressor.

Other objects and advantages of the present invention will be made apparent in the course of the following specification, reference being made therein to the accompanying drawings wherein:

Figure 1 is a diagrammatical illustration of an intake manifold pressure control system embodying the control system and method of controlling the turbine and compressor speed which form the subject of the present invention.

Figure 2 is a sectional view of the control unit or apparatus illustrated diagrammatically in Figure 1.

Figure 3 is an end view thereof.

Figure 4 is a sectional view taken along the line 4—4 in Figure 2.

Referring now more particularly to the drawings, there is shown in Figure 1, in schematical form, an engine 10 of the internal combustion type and which may be used in an aircraft. Air for combustion is supplied to the engine through an intake 11, commonly located where air is forced into it by reason of the forward movement of the aircraft, a compressor or supercharger 12, a conduit 13, an after-cooler 14, a conduit 15, a carburetor 16, a conduit 17 in which a throttle 18 is located, a direct driven compressor 19, a conduit 20, and into an intake manifold 21 and thence into the engine.

The compressor 19 is driven by the engine, as indicated at 22, and is commonly arranged within or as a part of the intake manifold to not only compress the mixture of air and fuel received from the carburetor but to aid in evenly distributing the mixture to all cylinders of the engine. For convenience in illustration these parts, as well as others, are shown as separated and connected by the various conduits described.

Exhaust gases from the engine are delivered from an exhaust manifold 23 and may either flow direct to atmosphere through a by-pass duct 24, or may flow through conduit 25 to a turbine 26 from which they escape to atmosphere through an outlet 27. The turbine 26 is connected by a shaft 28 to the compressor 12 and when this shaft is rotated by the turbine the compressor is operated to draw in air and deliver it under pressure to the induction system of the engine.

A valve or damper 29, commonly called the waste gate, is provided in duct 24 and may be positioned to control the flow of exhaust gases to the turbine, such flow increasing, and the speed of the turbine and compressor increasing, as the waste gate is closed, and vice versa.

The after-cooler 14 is provided to reduce the temperature of the air received from the compressor 12, wherein the temperature is raised by the heat of compression. The air received from the compressor passes in heat exchanging relation to fresh air passing through the after-cooler and with suitable control (not here shown) over the extent of such cooling employed.

In the carburetor 16 fuel from a supply not shown in the drawing is mixed with the air from the compressor 12 and is delivered under control of the throttle 18 to the compressor 19 and the engine. The throttle may be positioned by a hand control 30.

The waste gate 29 is positioned by means of a motor 31 through a gear train 32. The motor 31 is of the split phase, reversible type, having a pair of field windings 33 and 34 which are spaced ninety electrical degrees apart, and an armature 35. The field winding 33 is energized by a secondary winding 36 of a transformer 37 having a primary winding 38 connected to a suitable alternating current source, and the energizing circuit may be traced from one terminal of secondary winding 36 through a conductor 39, a condenser 40, field winding 33 and a conductor 41 back to the other terminal of the secondary winding.

The other field winding 34 is energized by and under control of an amplifier 42 to which the winding is connected by a pair of conductors 43—44. The amplifier 42 may be supplied with electrical energy by another secondary winding 45 on the transformer 37 to which the amplifier is connected by conductors 46—47.

The amplifier 42 has a pair of signal input terminals 48—49 and supplies the motor field winding 34 with an alternating current the phase angle of which depends upon the phase of an alternating current signal applied to said input terminals. Any amplifier of suitable characteristics may be used, but I prefer to employ one of the type shown in Figure 1 of the copending application of Albert P. Upton Serial No. 437,561, filed April 3, 1942, now Patent No. 2,423,534, issued July 8, 1947.

It will be evident that if the phase of the alternating current signal applied to terminals 48 and 49 is reversed, the current supplied to the motor field winding 34 may thus lead or lag the current in winding 33 by ninety electrical degrees, due to the condenser 40, and the direction of motor rotation will depend on whether such current leads or lags the current continuously supplied to the motor by transformer secondary winding 36. This, as noted above, is a function of the phase of the signal applied across the amplifier input terminals 48—49 and it will thus be seen that the direction and duration of the motor rotation may be controlled by the exciting signal.

The signal applied to the amplifier input terminals 48—49 is determined by electrical conditions in a compound network composed of three separate electrical networks connected in series. The signal circuit may be traced from the input terminal 48 through a conductor 50, a first electrical network 51, a conductor 52, a second electrical network 53, a conductor 54, a third electrical network 55, and a conductor 56 back to input terminal 49.

The first electrical network 51 comprises a transformer secondary winding 57 across the terminals of which is connected a slidewire resistance 58 through conductors 59 and 60. The aforesaid conductor 50 is connected to a slider 61 which is movable along the resistance 58 by a knob 62 and which cooperates with said resistance to form a control point adjuster designated generally by reference numeral 63.

Another slidewire resistance 64 is connected by one terminal through a conductor 65 to the lower terminal of the secondary winding 57 and its opposite terminal is connected by a conductor 66 to a center tap on winding 57. A manually adjustable slider 67 cooperates with the resistance 64 and together therewith forms a calibrating potentiometer designated generally at 68. The center tap on the secondary winding 57 is also connected as shown by a conductor 69 to the center of slidewire resistance 58 and this connection of the network reduces the impedance between the respective sliders 61 and 67 but does not otherwise affect the operation.

The second electrical network 53 likewise comprises a transformer secondary winding 70 across the terminals of which is connected a slidewire resistance 71 by means of conductors 72 and 73. A slider 74 cooperates with the resistance 71 and together therewith forms a main pressure controller 75. The conductor 52 connects the sliders 67 and 74. The slider 74 is positioned in accordance with the pressure at the intake manifold 21 of the engine, or at the carburetor 16 if desired. For this purpose a pressure take-off duct 76 is led from the engine to a bellows 77. A second compensating bellows 78 is evacuated so that its expansion and contraction depends wholly upon atmospheric pressure. The two bellows 77 and 78 are supported with their free ends at opposite sides of the slider 74 and are connected thereto by a link 79. The arrangement as shown is such that the slider 74 will move to the right along resistance 71 when the pressure in the duct 76 decreases, and vice versa. Since both bellows are exposed to atmospheric pressure, the effect of atmospheric pressure will be cancelled out.

A second slidewire resistance 80 is also connected across the terminals of the secondary winding 70, by means of conductors 81 and 82 and a slider 83 connected to conductor 54 cooperates with this resistance. The resistance 80 and slider 83 together form a rate of change of acceleration compensating controller 84. This controller is operated in accordance with the rate of change of acceleration of the turbine 26 and compressor 12 by means later to be described. It may be noted at this point, however, that the slider 83 remains at the position shown, upon a contact 85 forming a part of the resistance 80, so long as the rate of change of acceleration of the turbine and compressor does not exceed a safe value, the contact 85 forming a "dead spot" and preventing any effect on the system from minor changes in the rate of acceleration of the turbine. When the rate of change of acceleration exceeds a safe value the slider 83 sweeps to the right along the resistance 80.

The third electrical network 55 also includes a transformer secondary winding 86 and this winding, along with the other secondary windings 57 and 70 may be arranged on the transformer 37 previously described. While it has been deemed preferable from the standpoint of clarity of illustration to show the secondary windings at various locations close to the apparatus energized by them, the primary winding 38 has been illustrated in connection with each secondary winding to indicate that the secondary windings are all associated with transformer 37.

A slidewire resistance 87 is connected at one end by a conductor 88 to one end terminal of the secondary winding 86 and is connected at its other end by a conductor 89 to a tap 90 at an intermediate point on the winding 86. A slider 91 cooperates with the resistance 87 and is connected to conductor 54, this slider and resistance together forming an overspeed compensating controller designated generally at 92. This controller is adjusted in accordance with the speed of the turbine 26 and compressor 12 by means later to be described in detail and the position of the slider 91 along the resistance 87 is indicative of this speed. As long as the speed does not exceed a safe value the slider and resistance remain in the relative positions indicated but overspeeding will cause the resistance to move to the right relative to the slider. This has the same effect as though the slider moved towards the left.

The network 55 also includes a slidewire resistance 93 and a cooperating slider 94 which is connected to the conductor 56. One terminal of the resistance 93 is connected by a conductor 95 to the tap 90 on the secondary winding 86 and the other terminal of the resistance is connected by a conductor 96 to the other terminal of the secondary winding 86. The resistance 93 and slider 94 form a follow-up potentiometer 97 and the slider 94 is positioned by the motor 31, through a connection to the gear train 32, concurrently with the movement of the waste gate 29.

*Operation of Figure 1*

In operation it will be evident that the signal potential applied across the input terminals 48 and 49 of the amplifier 42 will be the algebraic sum of the potentials produced in the three networks 51, 53 and 55.

For convenience in description, the conditions existing during a half cycle at which the instantaneous polarity is as indicated by the legends on the drawing are assumed. For a reference potential the conductor 50 is shown as grounded at 98.

Considering now the first network 51, it will be evident that as here shown the slider 61 is above the center of the resistance 58 and hence it is at a positive potential with respect thereto. The slider 67 being at a center point along the resistance 64 is at a negative potential with respect to the center of resistance 58, and the center tap of the winding 57. The network 51 thus introduces into the series circuit to the amplifier a potential such that the conductor 52 is negative with respect to the grounded conductor 50.

In the second network 53 with the sliders 74 and 83 in the positions shown, a potential is introduced into the circuit which is equal to the potential of slider 74 with respect to the left-hand terminal of secondary winding 70. This potential is of such polarity that the slider 83, and conductor 54, are positive with respect to slider 74. The potential of the slider 83 with respect to ground depends upon the relative magnitudes of the opposing potentials introduced by the networks 51 and 53. For purposes of this description it may be assumed that the positive potential introduced by network 53 is slightly greater than the negative potential introduced by network 51.

The conductor 54 is thus slightly positive with respect to grounded conductor 50.

Turning now to the third network 55, it will be evident that with slider 91 at the extreme right or negative end of the resistance 87 the conductor 89 leading to tap 90 on the secondary winding 86 is at the same potential as the conductor 54. The left terminal of the resistance 93 is of course positive with respect to the right. With the slider 94 at center of the resistance 93, the potential introduced into the series circuit is the potential between the slider 94 and the left terminal of the resistance 93. This network 55 thus introduces a negative potential into the circuit and under balanced conditions this negative potential will have the same magnitude as the positive potential produced by networks 51 and 53. These equal potentials oppose each other and the conductor 56 is thus at the same potential as grounded conductor 50 so that no signal is applied to the amplifier 42. No current is then applied to the motor field winding 34 which can rotate the motor, and the waste gate 29 remains at rest while the compound network is balanced.

With the parts in the positions shown and described, an increase in pressure in the induction system of the engine will operate the bellows 77 to move the slider 74 to the left along the resistance 71. Immediately this reduces the magnitude of the positive potential introduced by the network 53 and it becomes less than the sum of the negative potentials produced by the networks 51 and 55. The amplifier input terminal 49 now becomes negative with respect to the terminal 48, a signal potential is applied to the amplifier 42 and it responds by applying a current to the motor field winding 34 causing the motor 31 to rotate. The connections and constants of the system are so selected that a signal potential of this polarity or phase will cause the motor to run in the proper direction to move the waste gate 29 toward open position. At the same time the operation of the motor moves the slider 94 toward the left along the resistance 93.

The opening of the waste gate 29 reduces the pressure differential across the turbine 26 causing it to run at lower speed and lowering the compression ratio of the compressor 12 thereby reducing the pressure of the air supplied to the engine. At the same time the movement of the slider 94 to the left reduces the balancing potential introduced in the compound network. This movement of the slider 94 and of the waste gate 29 continues until the positive potential introduced by the controller 75 is exactly balanced by the sum of the potential introduced by the network 51 and the balancing potential introduced by the follow-up potentiometer 97, whereupon the motor 31 stops.

In a similar manner, a decrease in pressure at the manifold 21 causes the movement of the slider 74 toward the right along resistance 71. This introduces a potential such that amplifier input 49 becomes positive with respect to grounded terminal 48. A signal potential is again applied to the amplifier but of opposite polarity or phase causing the motor 31 to run in the opposite direction to close the waste gate 29 and build up pressure. At the same time the follow-up potentiometer slider 94 is run toward the right introducing a rebalancing potential which will stop the motor when the pressure returns to a more nearly normal value.

The effect of the network 51 will next be considered. With all other sliders in the compound network remaining in the positions shown, the movement of the slider 61 upwardly along the resistance 58 will introduce a potential such as to make amplifier input terminal 49 negative with respect to the terminal 48 thereby causing an opening movement of the waste gate and a decrease in the manifold pressure. On the other hand, a downward movement of slider 61 from the position shown will make the terminal 49 positive with respect to terminal 48, causing the waste gate to run toward closed position and increasing the discharge pressure of the compressor. In each case the follow-up potentiometer slider 94 will be moved concurrently with the movement of the waste gate to rebalance the system.

It is in connection with the rate of change of acceleration compensating controller 84 and the overspeed compensating controller 92 that the present invention is concerned. Their effect on the operation of the system will be described at this point.

When the slider 83 is moved to the right, as will occur when the turbine and compressor change their acceleration at too great a rate, there is introduced into the compound network a potential such that the input terminal 49 of the amplifier 42 becomes increasingly negative with respect to input terminal 48. As previously described, a signal potential of this polarity, or phase, causes the waste gate to run toward open position. Thus the excess rate of change of acceleration will be overcome and counteracted by an opening movement of the waste gate which, of course, reduces the speed at which turbine and compressor operate. A rebalancing movement of the slider 94 will also occur.

When the slider 91 is moved to the left along resistance 87, as it will be when the speed of the turbine and compressor exceeds a safe value, a potential will be introduced into the compound network such that the amplifier input terminal 49 becomes instantaneously negative with respect to terminal 48. This will of course cause the waste gate to be opened at once to reduce the speed of the turbine and compressor.

*Figures 2, 3 and 4*

Fundamentally the device shown in Figures 2, 3 and 4 comprises a means operated by the turbine or compressor, and establishing a rotating magnetic field, the speed and rate of acceleration change of which are indicative of the corresponding factors in the operation of the turbine and compressor. Means are provided then for utilizing this rotating magnetic field for adjusting or positioning the rate of change of acceleration compensating controller 84 and the overspeed compensating controller 92 to control the waste gate 29 as has been described.

As here shown, this device or apparatus comprises a shaft 100 which is operatively connected as indicated in Figure 1 by the gears 101 to the shaft 28, or is otherwise so arranged that the shaft 100 will be rotated concurrently with the turbine 26 and compressor 12. The shaft 100 carries a gear 102 meshing with a pinion 103 on a shaft 104 to rotate the latter, at a speed higher than, and proportional to, the speed of the turbine and compressor. The device further includes another shaft 105, for a purpose to be later described, and all three shafts 100, 104 and 105 are suitably supported in bearings 106 which may be a part of any suitable housing (not shown) enclosing and supporting the various parts.

Supported on the shaft 104 to be rotated thereby is a permanent magnet 107 which rotates within a shorted winding represented generally at 108. This winding is carried by a rotatable, or oscillatable, annular member or frame 109 which as here shown is journaled by means of an anti-friction bearing 110 upon the shaft 104 to turn freely with respect thereto. The member 109 is biased to normally move in a direction opposite to that at which the magnet 107 rotates, by means of a coil spring 111 which is attached at 113 at one end to the member 109 and at its other end is connected at 112 to a rigid part of the frame carrying the bearings 106, or to any other suitable anchor point.

A gear segment 114 is connected to the member 109 to move therewith and at one end may engage a stop 115 supported in its path and against which stop it will normally rest under influence of the spring 111.

As the magnet 107 rotates, a rotating magnetic field is set up which generates a current in the shorted winding 108. This effect tends to rotate the winding 108, and of course the member 109, along with the magnet, the extent of the pull upon the winding depending upon the speed at which magnet 107 rotates, and the magnitude of the current thus generated in the winding. The rotating tendency of the winding 108 and member 109 is opposed by the tension of the spring 111 but, when the speed of rotation of the magnet 107 increases above a certain point, the pull upon the winding will be such as to overcome the tension of the spring. The winding and member 109 will then oscillate in the direction indicated by the arrows in Figure 3 causing an angular displacement of the member 109. The extent of such angular displacement will depend upon the speed of rotation of the magnet 107 and hence reflects exactly the increase in speed of the turbine 26 and compressor 12. As the speed decreases, the spring 111 will return the parts toward initial or starting positions. This device is thus seen to act on the dynamometer principle.

The angular displacement of the member 109 as a function of the speed of the turbine and compressor is utilized as an overspeed control by attaching the resistance 87 of the overspeed compensating controller 92 to the member as shown in the drawings. For this purpose the resistance 87 may be supported upon an insulating segment 116 secured to the member 109 while the slider 91 of the controller 92 is supported rigidly, as represented at 117, adjacent the member 109 to travel over the resistance. It will be evident that the oscillating movement of the member 109, when the speed of rotation of the turbine and compressor approach an unsafe value, will move the resistance 87 past the slider 91 to have the same effect as shifting this slider to the left along the resistance. As has previously been described this action immediately introduces a potential into the compound network such that a signal is applied to the amplifier 42 to cause the waste gate 29 to open and reduce the speed.

When the parts are at rest the slider 91 is at the end of the resistance 87 as shown in Figure 3.

The angular displacement or oscillatory movement of the member 109 is also used to operate the shaft 105. For such purpose a pinion 118 is affixed to this shaft 105 and is placed in mesh with the gear segment 114 so that the shaft will be oscillated about its axis when the member 109 moves as described. An inertia member or mass 119 in the form of a circular disk, is supported by means of an anti-friction bearing 120 upon the shaft 105 and a light spiral coil spring 121 is connected at one end at 122 to this member 119 and at its other end is attached to the shaft as shown at 123. The spring 121 exerts a light tension on the member 119 such as to tend to normally rotate it with respect to the shaft 105, as will be understood. The resistance 80 of the acceleration change compensating controller 84, previously described, is applied to and carried on the inertia member 119 by means of a suitable insulating member 124, while the slider 83 for cooperating with the resistance 80 is carried by a suitable insulating attachment knob 125 secured to the end of the shaft 105.

In operation, then, as the shaft 105 is turned at an increasing rate by the aforesaid angular displacement motion of the member 109 by an increase in the acceleration of the turbine and compressor, the inertia of the member 119 will cause it to lag initially so that it has an angular displacement with respect to the shaft. This action results in a shifting between the slider 83 and resistance 80 such that the slider moves off the "dead-spot" contact to the right along the resistance. As has been described, the result of such movement introduces a potential into the compound network such that a signal is applied to the amplifier 42 of a phase relation such as to cause the waste gate 29 to move toward open position. It will be evident therefore that, if the rate of movement of the member 109 carrying the shorted winding 108, responsive to an increase in speed of the turbine and compressor, changes rapidly enough to cause the inertia member 119 to substantially lag the resulting movement of the shaft 105, then the waste gate will be moved toward open position to counteract the tendency toward excessive change in acceleration of the turbine and compressor, of which such movement of the members 109 and 119 is indicative. Inasmuch as the tendency toward an excessive change in acceleration such as to interfere with operation of the control system or to have a deleterious effect on the turbine and compressor, will normally occur only near the higher operating speed of these parts the foregoing effect will be complemented by an opening movement of the waste gate in response to an overspeed indication. The sum of such effects will obviously offer complete protection against both overspeeding and an excessive rate of change of acceleration.

My invention is thus seen to reside in a system and apparatus for creating a rotating magnetic field, the velocity and rate of change in acceleration of which is directly indicative of the corresponding functioning of the turbine and compressor, and utilizing the resulting current generated in a shorted winding influenced by the magnetic field to control the operation of the turbine and compressor.

While I have shown and described a certain preferred embodiment of my invention, it will be readily understood that modifications thereof will be apparent to those skilled in the art, and I therefore wish to be limited only by the scope of the appended claims.

I claim as my invention:

1. In combination with a motor means, control apparatus for controlling the speed and acceleration of said motor means, said apparatus comprising means including a balanceable impedance network for controlling said motor means in accordance with the unbalance of said network, relatively movable magnetic and conductive members, a connection between said motor means and a first of said members to cause movement of said first member at a speed dependent upon that of said motor means and by reason of the electrodynamic action between said members to tend to cause movement of the second of said members, said second member being yieldably biased to a predetermined position so that the extent of its movement, upon the speed of the first member reaching a predetermined value, is dependent upon the speed of said first member, a first impedance device in said network adjusted in accordance with the extent of movement of said second member and a second impedance in said network adjusted in accordance with the rate of acceleration of said second member.

2. In combination with a motor means, control apparatus for controlling the speed and acceleration of said motor means, said apparatus comprising means including a balanceable impedance network for controlling said motor means in accordance with the unbalance of said network, relatively movable magnetic and conductive members, a connection between said motor means and a first of said members to cause movement of said first member at a speed dependent upon that of said motor means and by reason of the electrodynamic action between said members to tend to cause movement of the second of said members, said second member being yieldably biased to a predetermined position so that the extent of its movement, upon said first member reaching a predetermined speed, is dependent upon the speed of said first member, a first impedance device in said network adjusted in accordance with the extent of movement of said second member, a second impedance device in said bridge, two relatively movable elements associated with said second impedance device and effective upon relative movement thereof to cause adjustment of said second device, and means connecting one of said elements positively to said second member and the other of said elements yieldably to said second member so that the relative movement of said members is dependent upon the rate of acceleration of said second member.

3. In combination with motor means, control apparatus for controlling the speed and acceleration of said motor means, said apparatus comprising means including a balanceable impedance network for controlling said motor means in accordance with the direction of unbalance of said network, a magnetic member operatively connected to said motor means and rotatable thereby at a speed dependent upon that of said motor means, a second member having a winding inductively associated with said magnetic member, said second member being resiliently biased to restrict movement thereof, a first impedance in said network, means including said second member for adjusting said first impedance in accordance with the speed of rotation of said magnetic member upon said speed reaching a predetermined value, and a second impedance in said network adjusted in accordance with the rate of change of adjustment of said first impedance.

4. In a governor for detecting excessive velocity and a rate of acceleration, relatively movable members one of which produces a magnetic field and the other of which includes at least one turn of electrically conductive material, means for connecting a first of said members to a movable element the velocity and rate of acceleration of which it is desired to detect, said connection acting to cause movement of said first member and tending by reason of the electrodynamic action between said members to cause movement of the second of said members, means for yieldingly opposing the movement of said second member so that the extent of such movement, upon the speed of said first member reaching a predetermined value, is dependent upon the speed of said first member, a first control device operatively upon movement of said second member; a second control device, and means respective to the rate of change of movement of said second member for causing operation of said second control device when the rate of change of movement of said second member exceeds a predetermined value.

5. In a governor for detecting excessive change in acceleration, relatively movable members one of which produces a magnetic field and the other of which includes at least one turn of electrically conductive material, means for connecting a first of said members to a movable element the change of acceleration of which it is desired to detect, said connection acting to cause movement of said first member and tending by reason of the electrodynamic action between said members to cause movement of the second of said members, means for yieldingly opposing the movement of said second member so that the extent of such movement, upon said first member reaching a predetermined speed, is dependent upon the speed of said first member, a control device, said control device having two relatively movable elements associated therewith and being effective to change its controlling effect upon relative movement of said elements, one of said elements having a relatively large moment of inertia, and means connecting said one element by a resilient connector to said second member and the other element positively to said second member so that the relative movement of said elements is dependent upon the acceleration of said second member.

6. In a governor for detecting excessive velocity and change in acceleration, relatively movable members one of which produces a magnetic field and the other of which includes at least one turn of electrically conductive material, means for connecting a first of said members to a movable element the velocity and rate of change of acceleration of which it is desired to detect, said connection acting to cause movement of said first member and tending by reason of the electrodynamic action between said members to cause movement of the second of said members, said second member being yieldably biased to a predetermined position so that the extent of movement of said second member, upon the speed of said first member reaching a predetermined value, is dependent upon the speed of said first member, a first control device operatively connected to said second member and operated upon movement of said second member, a second control device, said second control device having two relatively movable elements associated therewith and being effective to change its controlling effect upon relative movement of said elements, one of said elements having a relatively large moment of inertia, and means connecting said one element by a resilient connector to said second member and the other element positively to said second member so that the relative movement of said elements is dependent upon the rate of acceleration of said second member.

7. In combination with a motor means, control apparatus for controlling the speed and acceleration of said motor means, said apparatus comprising means including a balanceable impedance network for controlling said motor means in accordance with the unbalance of said network, relatively moveable magnetic and conductive members, a connection between said motor means and a first of said members to cause movement of said first member at a speed dependent upon that of said motor means and by reason of the electrodynamic action between said members to tend to cause movement of the second of said members upon the speed of the first member exceeding a predetermined amount, biasing means acting upon said second member to resiliently restrict the movement thereof, a first impedance device in said network adjusted in accordance with the extent of movement of said second member and a second impedance device in said network adjusted in accordance with the rate of acceleration of said second member.

MERLE R. LUDWIG.

REFERENCES CITED

The following references are of record in the file of this patent:

UNITED STATES PATENTS

| Number | Name | Date |
|---|---|---|
| 1,557,793 | Berger et al. | Oct. 20, 1925 |
| 1,562,666 | Toth | Nov. 24, 1925 |
| 1,586,233 | Anschutz-Kaempfe | May 25, 1926 |
| 1,610,628 | Staege | Dec. 14, 1926 |
| 1,709,689 | Staege | Apr. 16, 1929 |
| 1,718,935 | Alden | July 2, 1929 |
| 1,777,458 | Allen | Oct. 7, 1930 |
| 1,807,173 | Ray | May 26, 1931 |
| 1,947,602 | Kerr | Feb. 20, 1934 |
| 1,989,547 | Clark | Jan. 29, 1935 |
| 2,015,861 | Mitereff | Oct. 1, 1935 |
| 2,225,206 | Cassels | Dec. 17, 1940 |
| 2,237,118 | Schwendner | Apr. 1, 1941 |
| 2,247,151 | Clarke | June 24, 1941 |
| 2,347,613 | Rodanet | Apr. 25, 1944 |
| 2,376,142 | Hoffman et al. | May 15, 1945 |
| 2,376,143 | Edwards et al. | May 15, 1945 |
| 2,390,581 | Gille | Dec. 11, 1945 |

FOREIGN PATENTS

| Number | Country | Date |
|---|---|---|
| 479,602 | Great Britain | Jan. 28, 1938 |

Certificate of Correction

Patent No. 2,537,902 January 9, 1951

MERLE R. LUDWIG

It is hereby certified that error appears in the printed specification of the above numbered patent requiring correction as follows:

Column 10, line 42, for the word "bridge" read *network*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*